United States Patent [19]

Uhlig

[11] 3,949,033

[45] Apr. 6, 1976

[54] METHOD OF MAKING A BLOWN PLASTIC CONTAINER HAVING A MULTI-AXIALLY STRETCH ORIENTED CONCAVE BOTTOM

[75] Inventor: Albert R. Uhlig, Toledo, Ohio

[73] Assignee: Owens-Illinois, Inc., Toledo, Ohio

[22] Filed: Nov. 2, 1973

[21] Appl. No.: 412,161

[52] U.S. Cl. .................. 264/89; 264/97; 264/98; 264/296; 264/312; 425/DIG. 214; 425/DIG. 215; 425/DIG. 216
[51] Int. Cl.² ............................................ B29C 17/07
[58] Field of Search ............ 264/89, 90, 92, 93, 94, 264/96, 97, 98, 99, 296, 310, 312; 425/326 B, 387 B, DIG. 214, DIG. 215, DIG. 216

[56] References Cited
UNITED STATES PATENTS

| 2,715,751 | 8/1955 | Weber | 264/97 X |
| 3,278,665 | 10/1966 | Harrison | 264/98 |
| 3,754,851 | 8/1973 | Reilly et al. | 264/98 X |
| 3,757,718 | 9/1973 | Johnson | 264/89 X |
| 3,764,644 | 10/1973 | Robinson | 264/296 X |
| 3,819,789 | 6/1974 | Parker | 264/296 X |

FOREIGN PATENTS OR APPLICATIONS

| 911,228 | 11/1962 | United Kingdom | 264/98 |
| 1,001,672 | 8/1965 | United Kingdom | 264/98 |
| 1,147,118 | 4/1969 | United Kingdom | 425/DIG. 215 |

*Primary Examiner*—Jan H. Silbaugh
*Attorney, Agent, or Firm*—Philip M. Rice; E. J. Holler

[57] ABSTRACT

This invention relates to a method of making a blown plastic container having a concave pressure bottom configuration by blowing a pre-form into a container having a flat bottom, then contacting and deforming the flat bottom to reform the flat bottom into the desired pressure bottom configuration. The flat bottom is reformed by blowing, or by mechanical contact, or both blowing and contact, at a temperature conducive to multi-axial orientation to provide a pressure bottom of increased strength. To facilitate the performance of the method utilizing an initial parison formed by free extrusion, the present invention further contemplates smoothing out any pinch flash and distributing it on the bottom of the parison, so that the pinch flash will not interfere with subsequent forming of the bottom of the final container as above described.

6 Claims, 15 Drawing Figures

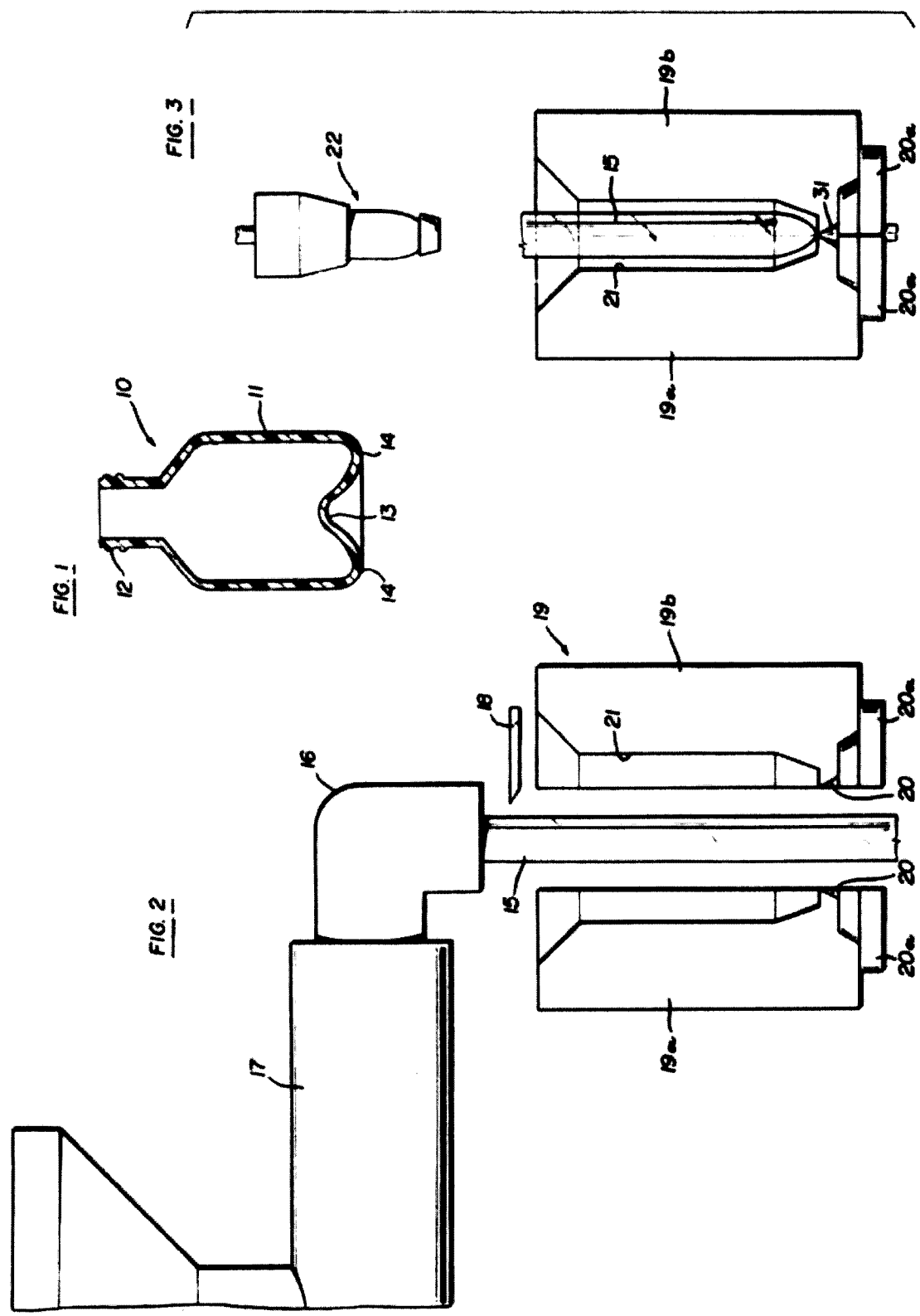

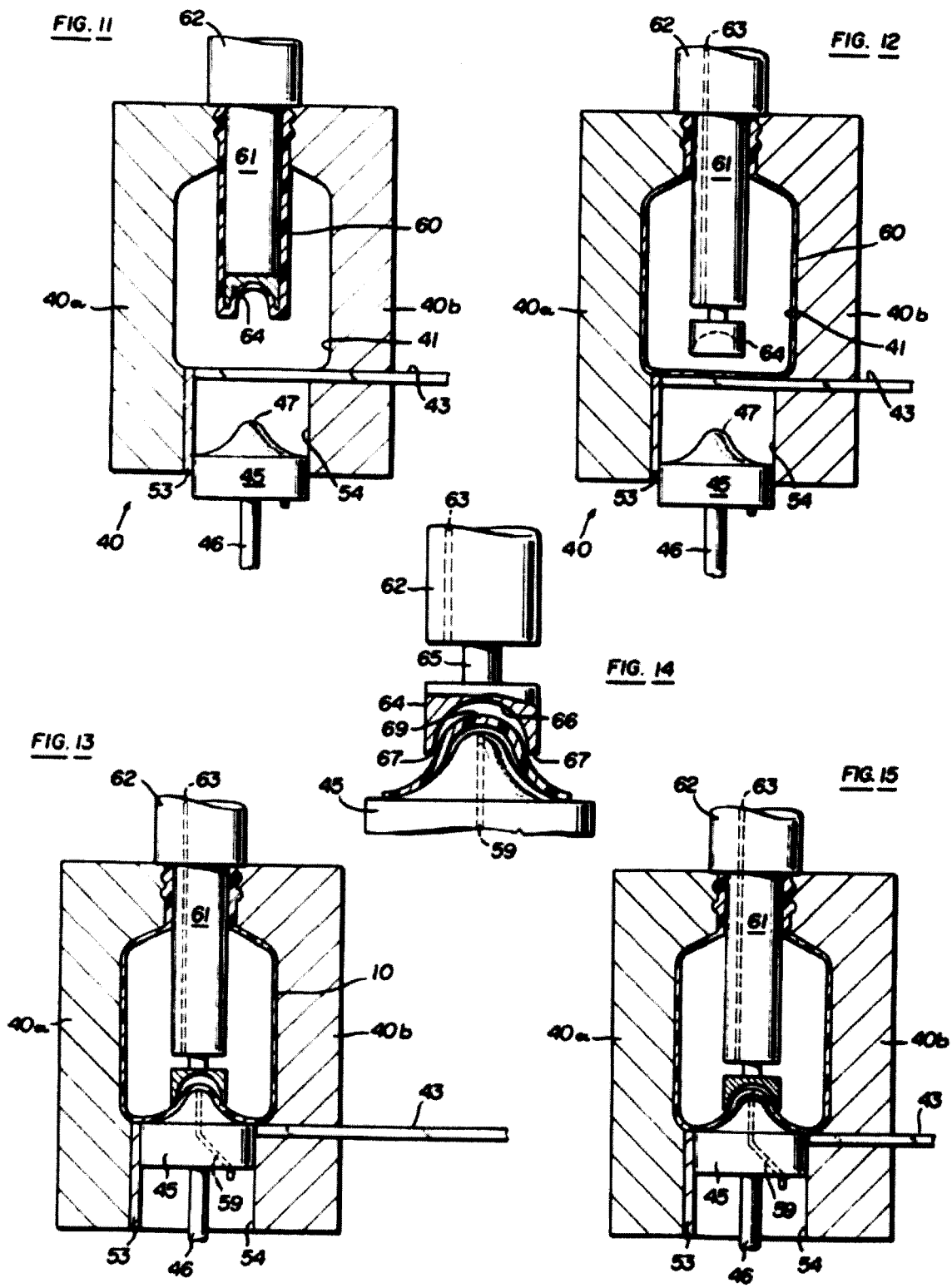

METHOD OF MAKING A BLOWN PLASTIC CONTAINER HAVING A MULTI-AXIALLY STRETCH ORIENTED CONCAVE BOTTOM

CROSS REFERENCE TO RELATED APPLICATIONS

This application is related to the previously filed applications, U.S. Ser. No. 103,624, filed Jan. 4, 1971, entitled "Method and Appratus for Blow Molding", now Pat. No. 3,767,747 and Ser No. 225,449, filed Feb. 11, 1972, entitled "Blown Plastic Container," Patent No. 3,843,005 both filed in the name of Albert R. Uhlig and both assigned to the assignee of the present invention.

BACKGROUND OF THE INVENTION

In the development of containers for the retention of liquid under pressure, for example, beer, carbonated beverages and the like, it is desirable to provide the container with a "pressure bottom" configuration. Such pressure bottom configurations are arcuate and may be either concave or convex as set forth in my prior application Ser. No. 225,449, now U.S. Pat. No. 3,843,005. These arcuate bottom configurations avoid a sharp contour transition portion located at the "heel" of a conventional flat-bottom container, and, as a result, enhanced bottom strength in the container is obtained. This greater bottom strength is an advantage which may be obtained in several ways. First, the arcuate design itself is better adapted to serve as a pressure vessel. Secondly, by not moving the plastic material during blowing into sharp bottom areas or heels of the container, the unavoidable thinning of the plastic material at the heel does not occur.

The formation of blown plastic containers having arcuate pressure bottom configurations is quite difficult because the "blow-up" of a cylindrical parison to the intricate, concavo-convex configuration results in the thinning of the material in the bottom area. Additionally, the bottom region of the preform or parison is generally hotter than the remainder of the parison, and it is difficult to biaxially orient the bottoms of blown containers. In my copending application, Ser. No. 103,624, now U.S. Pat. No. 3,767,747 there is described a method and apparatus for obtaining a vessel or container having enhanced physical strength because of the molecular orientation (stretch orientation) of the thermoplastic material during manufacture. However, prior to my present invention, there was no satisfactory method or apparatus for providing blown plastic containers having (1) pressure bottoms of uniform thickness and (2) pressure bottoms which are biaxially oriented.

Furthermore, the prior art cannot provide such pressure bottoms, where the container is made initially from a freely extruded parison. because the accumulation of material at the pinch-off exaggerates both the material distribution problem and the temperature differential problem.

BRIEF DESCRIPTION OF THE PRESENT INVENTION

The present invention now provides an improved method for making a container such as a beverage bottle or the like for retaining contents under pressure and having an arcuate pressure bottom which is of substantially uniform wall thickness and which is multi-axially stretch oriented to provide enhanced physical strength. According to the method of the present invention, a blown plastic container is formed having an initial flat bottom, which is then stretched axially of the blown container to reform the flat bottom into the desired pressure bottom configuration, the reforming being carried out at a temperature at which the bottom is still plastically deformable and preferably at a temperature conducive to multi-axial orientation, thus providing the pressure bottom of increased strength. The reforming may be carried out by mechanical contacting and stretching, by blow molding, or by a combination of both contacting and blowing.

If the initial parison is freely extruded, a pre-form is blown and any pinch-off area flash material is then distributed along the bottom of the container to provide a uniform bottom and to avoid an accumulation of pinchoff flash which negatively affects orientation. If the initial parison is injection molded, this additional step of "bottom material distribution" is not necessary, although the gate area of the injection molded parison will be slightly hotter than the remainder of the parison and some cooling to the orientation temperature may be necessary.

The apparatus of the present invention includes a mold having an open-ended interior cavity and having movable first and second bottom or end members for closing the open end of the cavity. The first bottom member, when utilized to close the cavity end, provides a flat bottom surface in the mold cavity for the formation of a blown container with a flat bottom. After blowing, the first bottom member is removed, and the second bottom mold member is positioned to close the cavity. This second member is then displaced axially into the cavity and is moved axially inwardly of the cavity and inwardly of the blown container to physically contact and reform the flat bottom of the blown container upwardly into a concave pressure bottom.

The second bottom member may have an internal conduit connected to a source of air under pressure, and the container bottom may be reformed by blow molding alone or in combination with physical reforming.

When the container of the present invention is manufactured from a freely extruded parison, the parison is first blown in a pre-form mold into a pre-form having a shape intermediate the shape of the final container but larger than the parison, as set forth in my prior copending application Serial No. 103,624 now U.S. Pat. No. 3,767,747. During the formation of the pre-form, a pre-form smoothing element moves axially interiorly of the blown pre-form to smooth out and distribute the pinch-off flash at the bottom of the blown pre-form. The smoothing element is heat conductive and also serves to cool the pinch flash. The preform is transferred to a final blow mold for blow molding a container with a flat bottom and then for reforming the bottom into a concave pressure configuration, as previously explained.

If the initial parison is injection molded, the gate area of the injection mold may be somewhat hotter than the temperature of the rest of the parison. In this situation, the first or flat bottom member of the final blow mold may be provided with a thermal conditioning means for reducing the temperature as set forth in the copending application Serial No. 225,448, filed Feb. 11, 1972, of Albert R. Uhlig, entitled, "Method of and Apparatus for Making Blown Plastic Articles," now abandoned and also assigned to the assignee of the present invention. Alternatively, a cooling element similar to the smoothing element above defined can be utilized. In either event the gate area of the injection molded parison may be cooled to the orientation temperature at which temperature the container is blown with a flat bottom and then reformed into a pressure bottom configuration.

OBJECTS

It is, therefore, an important object of the present invention to provide a method of making a blown plastic container capable of retaining fluid contents under pressure and including an arcuate pressure bottom wall.

Another important object of this invention is the provision of a method for making a blown plastic container capable of retaining liquid under pressure and including an arcuate pressure bottom which is of substantially uniform thickness and which is multi-axially stretch oriented.

A further important object of this invention is the provision of a method for making a blown plastic container having a curved pressure bottom by first blowing a container having a flat bottom and then deforming the bottom into the curved pressure bottom configuration at a temperature conducive to multi-axial molecular orientation.

Another important object of this invention is the provision of a method for making a blown plastic container having a curved pressure bottom by first blowing a container having a flat bottom and then deforming the flat bottom, by mechanical contact or by blow molding or both mechanical contact and blow molding, into the curved pressure bottom configuration.

It is another important object of the present invention to provide a method of making a blown plastic container having a stronger pressure bottom by distributing and cooling the pinch-off area flash of a freely extruded parison along the bottom of the container preparatory to blow molding the container.

A further important object of the present invention is the provision of a method utilizing an apparatus for making a blown plastic container having a pressure bottom configuration, the apparatus including a blow mold having an interior cavity with one open axial extremity corresponding to the location of the container bottom wall, and alternately used first and second movable elements for closing the cavity extremity, the first of said elements being laterally reciprocal for forming a flat bottom blown container, and the second of said elements being axially reciprocal for reforming the flat bottom into a concave pressure configuration.

Still another important object of the present invention is the provision of a method utilizing an apparatus for making a blown plastic container having a pressure bottom configuration, which apparatus includes a blow mold having an open end corresponding to the location of the bottom wall of the container, and two reciprocally movable mold elements for closing the open mold end, the first movable element for forming a flat bottom blown container and the second movable element being axially movable and having an internal passage for introducing blow air against the exterior flat bottom of said container, for reforming the flat bottom into a concave pressure configuration by blow molding, by physical deforming, or by both blow molding and physical deforming.

It is yet another and no less important object of the present invention to provide a method for making a blown plastic container in a blow mold having an open end and two relatively movable bottom walls alternately positionable to close the open mold end, by positioning a first one of the walls to close the open mold end, blowing a pre-form in said cavity and against said first wall to form a blown container having a flat bottom, removing said first wall and positioning a second one of said walls in contact with the blown container bottom to deform the previously blown container bottom into a concave pressure bottom configuration at a temperature conducive to multi-axial orientation.

IN THE DRAWINGS

FIG. 1 is a vertical sectional view of a container made by the method and apparatus of the present invention;

FIGS. 2 and 3 illustrate schematically the method and apparatus for forming an initial parison from a free extrusion apparatus;

Figure 5:
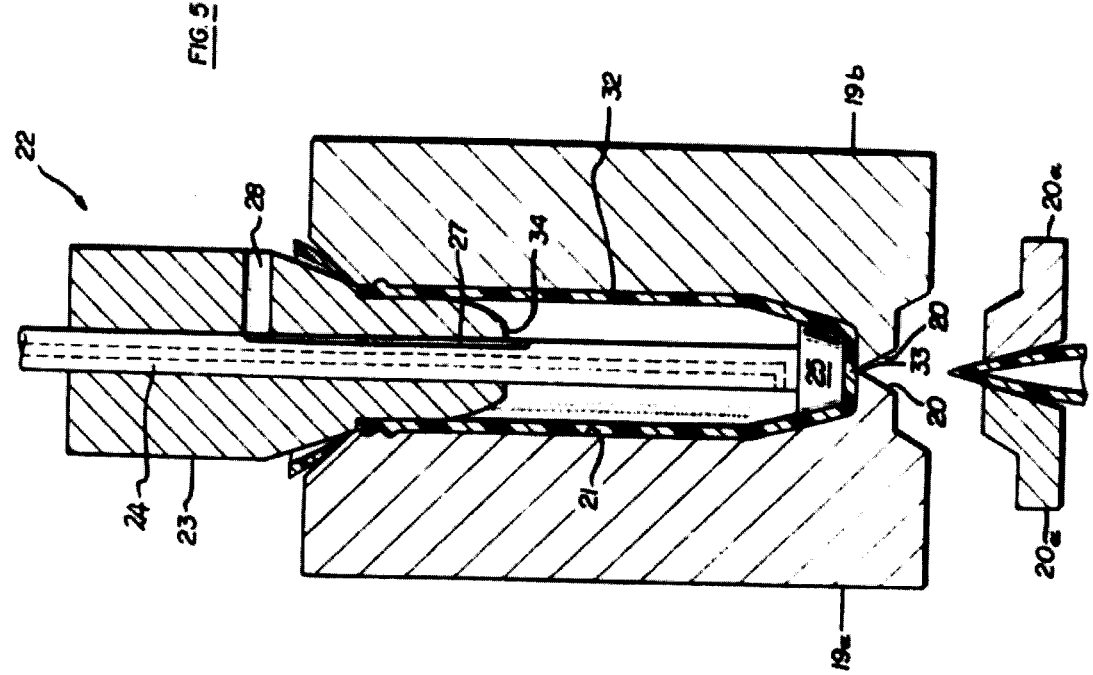
FIGS. 4 and 5 illustrate the method and apparatus for blowing a freely extruded parison into a pre-form and for distributing pinch-off flash material.

FIGS. 6 through 10 illustrate the method and apparatus of the present invention for taking a pre-form or an injection molded parison, blow molding the same into a container having a flat bottom, and reforming the flat bottom into a pressure bottom configuration; and FIGS. 11 through 15 illustrate an alternate method and apparatus of the present invention including reforming the container bottom by blow molding.

AS SHOWN IN THE DRAWINGS

In FIG. 1, reference numeral 10 refers generally to a bottle or container of the present invention made in accordance with the method and apparatus of the present invention. The container 10 is generally cylindrical in configuration and, as is understood in the blow molding art is integrally formed in one piece. More specifically, the bottle 10 includes an annular side wall 11 merging into and surmounted by an annular finish 12. The finish 12, as specifically illustrated, is adapted to receive a threaded beverage cap of the conventional type, but the finish 12 may provide full or partial helical threads, or may receive a snap-type cap or a crimped cap, or may take any other configuration as desired.

The side wall 11 merges downwardly into a lower, arcuate bottom wall 13 which is concave in shape to lie wholly above or interiorly of the lower corner or heel 14 of the container when the container is in its normal, upright, standing position. The arcuate bottom wall 13 is a "pressure bottom" in that its partially spherical configuration resists the pressure of a liquid or gas confined interiorly of the bottle.

In the manufacture of the bottle of FIG. 1, one alternate starting point as shown in FIG. 2 is the initial extrusion of a tubular parison 15 from an overhead, downwardly directed orifice block of an extrusion apparatus 17, the parison being severable from the block 16 by a knife 18 in a manner well-known in the prior art.

Prior to severing the extrudate by the knife 18, a pre-form blow mold 19 is moved into position surrounding the pendant parison 15 with the blow mold halves 19a and 19b being closable on the parison in a manner well-known in the prior art. The parison mold halves 19a and 19b carry at their lower extremities a pair of parison pinching surfaces 20 which are openable and closable with the blow mold sections 19a and 19b. Beneath the surfaces 20 are flash removal blocks 20a which are relatively axially movable (FIG. 5), also as well-known in the art.

The blow mold halves 19a and 19b define an interior pre-form blow mold cavity 21 which is of a shape intermediate the shape of the initial tubular parison 15 and of the final container 10.

As illustrated in FIG. 3, the next step involves the insertion of a blow pipe means 22 into the open, upper cut end of the parison 15 and the pre-form mold 19.

Figure 4:
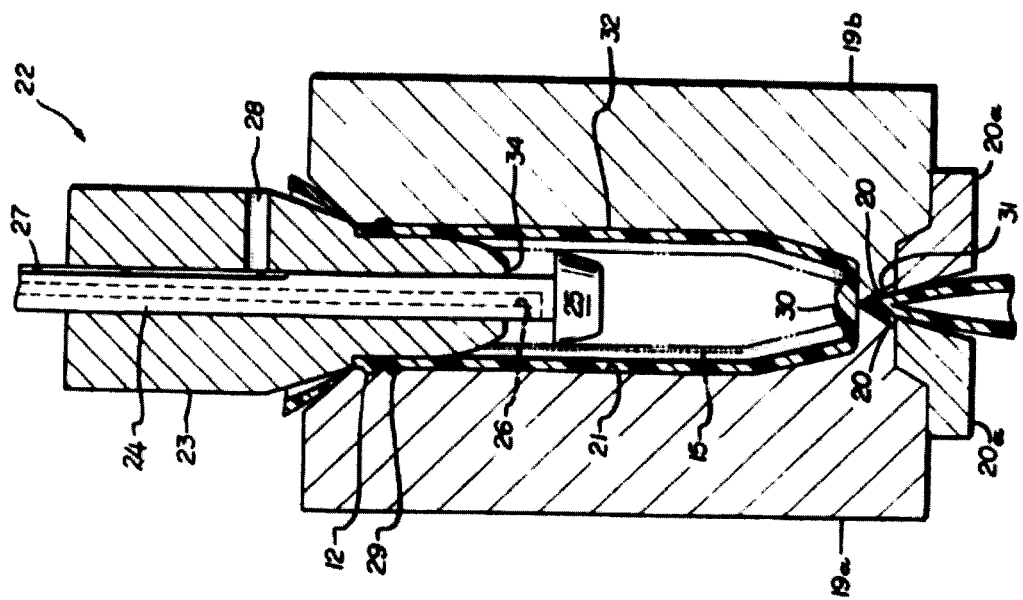

FIG. 4 illustrates the blow pipe 22 inserted into the parison 15. The blow pipe 22 includes a mandrel 23 having a central vertical pin 24 axially movable independently of a mandrel 23. The lower end of the pin 24 includes a frustroconical cap 25, and within the pin 24 there is an interior passageway 26 for the introduction of blow air with the passageway 26 opening outwardly of the pin 24 just above the cap 25. The pin 24 has an exterior longitudinal groove 27 which communicates with both the interior of a blown pre-form and an exhaust port 28 in the mandrel 23 for the exhaustion of blow air from the blown pre-form.

As the blow pipe 22 including the mandrel 23 is moved downwardly into the open end of the parison 15, the mandrel "calibrates" the upper end of the parison 15, i.e., the mandrel forces a portion of the parison 15 into grooves 29 in the pre-form mold halves 19a and 19b to form the threaded finish 12 for the final container, and the mandrel forms the cylindrical opening of the finish.

The pin 24 is moved axially downwardly into the parison 15 until the passageway 26 is in communication with the interior of the parison and air under pressure is introduced through the passageway 26 to inflate the tubular parison to the form of the pre-form cavity 21.

When the pre-form mold sections 19a and 19b enclose the parison 15 and pinch shut the bottom of the tubular parison 15, there is created interior pinch-off flash material 30 at the interior bottom portion of the parison 15. At the same time a "tail" section 31 is formed exteriorly of the pre-form between the pinch surfaces 20. The pinch flash removal blocks 20a are now moved axially downward from the position shown in FIG. 4 to the position shown in FIG. 5 to remove the tail 31 in a manner well-known in the art. The pin 24 is then extended axially downward within the blown pre-form 32 until the cap 25 comes into contact with the pinch-off flash 30. The vertical and/or rotational movement of the pin 24 and cap 25 smoothes out and distributes this pinch-off flash 30 along the bottom 33 of the blown pre-form. This provides a more uniform pre-form bottom 33, and the thermally conductive cap 25 will also remove heat from the thicker, hotter pinch area, thus providing a thermally uniform pre-form.

As the pin 24 moves downwardly within the blown pre-form 32, the cap 25 reaches the pinch-off flash material 30, and the bottom of the groove 27 in the exterior surface of the pin clears the bottom tip 34 of the mandrel 23. The exhaust port 28 now communicates with the interior of the pre-form, and the blow air from inside the pre-form may be exhausted along the groove 27 and out the port 28.

The blow pipe 22 is now removed, and a final blow pipe 36 is inserted into the blown pre-form. Blow pipe 36 includes an elongated internal central pin 38 having a frustroconical cap 39 mounted at the lower pin end.

Mold sections 19a and 19b are opened and the pre-form is transferred on the blow pipe means 36 into the final blow mold 40. For the purpose of explaining the remainder of the apparatus and the remaining steps in the present method, it is immaterial whether a blown pre-form 32 or an injection molded parison is enclosed within the final blow mold 40.

Figure 10:
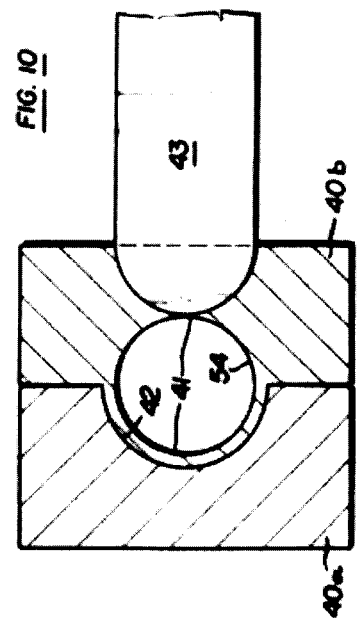
Figure 7:
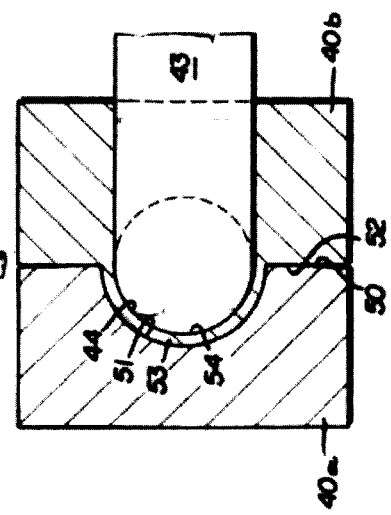

The final blow mold includes laterally displaceable mold sections 40a and 40b cooperably defining a blow mold cavity 41. The mold section 40a has its inner face 50 provided with a semi-cylindrical recess 51, and the mold section 40b has a corresponding inner face 52 provided with a semi-cylindrical protuberance 53 which snugly fits into the recess 51 when the blow molds are closed, as best seen in FIGS. 7 and 10. The protuberance 53 has a cylindrical vertical passage 54 therethrough, this passage opening at its upper end onto the blow mold cavity 41. The passage 54 thus defines an open end for the cavity 41, and this open end corresponds to the normal location of the blow mold bottom wall.

A flat elongated first bottom mold member 43 is carried by the blow mold section 40b for lateral reciprocal movement into and out of the mold cavity to open and close the cavity open end defined by the passage 54. This flat blow mold member 43 is formed as an elongated thin plate having a curved end 44 which fits snugly within the cylindrical passage 54 in the blow mold section 40b. The flat top of blow mold member 43, when positioned laterally inwardly as in FIG. 7, closes the passage 54 at its upper end and defines the bottom of the interior cavity 41 of the blow mold.

The final blow mold also includes a second blow mold bottom member 45 disposed within the passage 54 for axial reciprocal displacement (by means not shown) relative to the mold sections 40a and 40b. This second mold bottom 45, which may be mounted on a rod 46 connected to a piston or the like (not shown), and which fits snugly into the passage 54, has a domed or convex upper surface 47 corresponding to the configuration of the pressure bottom of the final container of FIG. 1, the convex surface 47 being directed inwardly toward the mold cavity 41.

Figure 6:
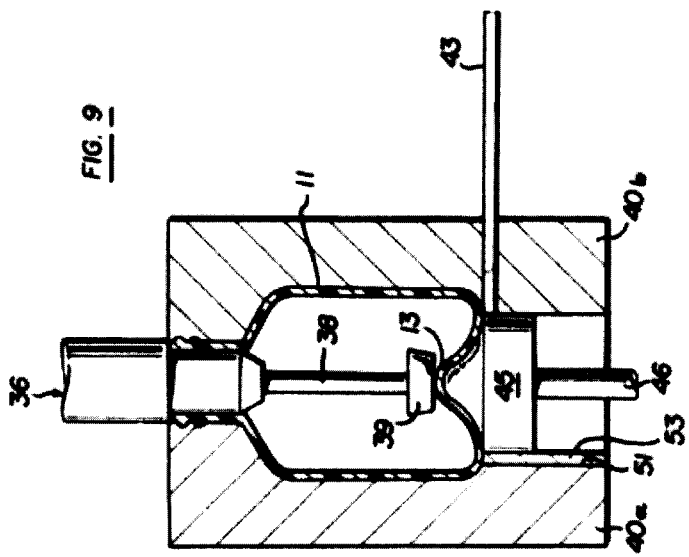
Figure 8:
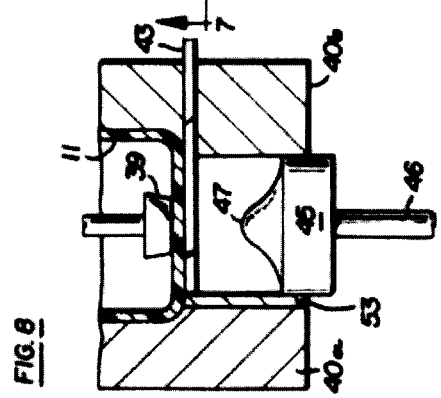

In the initial final blow molding operation carried out in the mold of FIGS. 6–8, upon closure of the blow mold sections 40a, 40b upon the blown pre-form, the first or flat blow mold bottom 43 is positioned as illustrated to define the bottom of the interior cavity 41.

The pin 38 is extended in a vertically downward direction to stretch the blown pre-form (or injection molded parison) until the bottom 33 thereof contacts the flat surface of the first mold bottom member 43. Then, air is introduced through the blow pipe 36 to inflate the pre-form to fill the interior cavity 41 of the mold 40.

This blowing operation forms the container 10 with a flat bottom. The bottom portion of the interior cavity is shown in FIG. 8. The blow air is then exhausted from the blown bottle, the first bottom mold member or plate 43 is moved laterally out of the blow mold 40 to the position shown in FIG. 9, and the second or curved blow mold bottom 45 is moved upwardly within the passageway 54, so that the convex surface 47 of the curved bottom mold member contacts and physically or mechanically reforms or pushes upwardly on the flat bottom of the container 10, while the bottom is at a temperature conducive to orientation, to form the arcuate pressure bottom configuration 13 as shown in FIG. 1. Blow air can again be injected into the reformed bottle to aid in cooling the blown bottle, if desired.

THE EMBODIMENT OF FIGS. 11–15

FIGS. 11–15 illustrate another method and apparatus for reforming the flat bottom of a blown container to provide a pressure bottom configuration, and include both mechanical reforming and the introduction of blow air to reform the pressure bottom configuration.

With reference to FIGS. 11–15, many of the elements are common to FIGS. 6–10 and therefore the same reference numerals will be utilized. Blow mold 40 includes laterally displaceable blow mold halves 40a and 40b cooperatively defining a blow mold cavity 41. Again, a flat elongated first bottom mold member 43 is carried by the blow mold section 40b for lateral reciprocal movement into and out of the mold cavity 41 to open and close the cavity open end defined by the passage 54. When the flat, first bottom blow mold member 43 is positioned laterally inwardly, it closes the passage 54 at its upper end and defines the bottom of the interior cavity 41 of the blow mold.

The final blow mold also includes the second blow mold bottom member 45 disposed within the passage 54 for axial reciprocal displacement on rod 46 connected to a piston or the like, has a convex upper surface 47 which is directed inwardly toward the mold cavity 41. The second mold bottom 45 also contains an internal passage or conduit 59 which is coupled to a source of air under pressure.

Since the inventive concepts are not limited to an initially extruded parison, FIGS. 11 through 15 will be explained in the context of an injection molded parison. However, it should be recognized that the concepts of FIGS. 11 through 15 may be utilized with an extruded parison and, similarly, the method and apparatus disclosed in FIGS. 6 through 10 may be utilized with an injection molded parison.

A parison 60 is injection molded on a mandrel 61 and, during the injection molding, the helical threads 12 are formed in a finish mold as is well-known.

The mandrel 61 is a split-pin mandrel having a main body 62 which includes an interior passageway 63 coupled to a source of air under pressure. At the lower extremity of mandrel body 62, the mandrel is split and a mandrel cap 64 is connected thereto by an internal, longitudinally reciprocable pin 65. When the pin is extended away from the mandrel body 62, blow air may be introduced through passageway 63 into the interior of the injection molded parison 60.

Upon closure of the blow mold halves 40a, 40b upon the injection molded parison 60, the first or flat blow mold bottom 43 is positioned as illustrated in FIG. 11 to define the first bottom of the interior cavity 41. The mandrel pin 65 is extended in a vertically downward direction to stretch the injection molded parison slightly. Then, air is introduced through the passageway 63 to inflate the injection molded parison to fill the interior cavity 41 of the mold 40.

This blowing operation forms the container 10 with a flat bottom. The blow air is then exhausted from the blown bottle through the passageway 63, the first bottom mold member or plate 43 is moved laterally out of the blow mold 40 to the position shown in FIG. 13 and the second or curved blow mold bottom 45 is moved upwardly within the passageway 54 so that the convex surface 47 of the curved bottom mold member reforms or pushes upwardly on the flat bottom of the container 10 while the bottom is at a temperature conducive to orientation to partially form the arcuate pressure bottom configuration 13.

The bottom of mandrel cap 64 has a concave surface 66, and at the conclusion of the mechanical reforming, the lower circular edge 67 of the concave surface 66 is in contact with the partially reformed bottom 69 of the container 10. This contact holds the partially reformed bottom 69 against the convex surface 47 of the second blow mold bottom 45 and provides a tight seal. Thus a cavity is defined interiorly of the edge 67 and concave surface 66. Then, blow air under pressure is introduced through the passage 59 in the blow mold bottom member 45 to inflate the portion 69 of the pressure bottom to fill this newly formed cavity, at a temperature conducive to multi-axial orientation.

Once the partially reformed bottom 69 is molded into its final pressure bottom configuration 13, the air is exhausted through passageway 59 and final blow mold bottom 45 is retracted.

It should be appreciated that after blow molding the flat bottom configuration, it is possible to extend the pin 65 vertically downwardly so that the circular edge 67 contacts the flat bottom of the container and forms a seal, and then introduce air under pressure without mechanical reforming so that the pressure bottom configuration is performed solely by blow molding.

The advantages which reside in the utilization of the techniques illustrated in FIGS. 6–15 of the drawings for the manufacture of the final container 10 will be readily appreciated. Because of the configuration of the final container, the attempted blowing of a cylindrical parison directly into the final container shape with a pressure bottom necessitates the greatest inflation and stretching of the parison in each heel section 14 of the container with resultant bottom weakness due to heel thinning. This can be readily appreciated upon a comparison of the pre-form shape of FIG. 6 to the final bottle shape of FIGS. 1 and 9.

By utilizing the technique of alternately defining the bottom of the final mold cavity with flat and curved bottom mold elements, it is possible to inflate the parison into the initial flat bottom shape and then mechanically, and/or by blow molding, deflect this bottom upwardly and inwardly at orientation temperature. As a result, the reformed bottom is of improved thickness uniformity, and the initially flat bottom is multi-axially stretch oriented to provide a pressure bottom of enhanced strength without the attendant thinness or weakness at the heel portion of the bottle. Furthermore, the combination of blowing and subsequent reforming results in a bottle of substantially constant wall thickness throughout the side walls, heel and pressure bottom.

Various additional features of the present apparatus will now be explained. With respect to FIGS. 4 and 5, the cap 25 on the extendable pin 24 may be made of metal so that as the cap contacts the bottom 33 of the blown pre-form 32, it cools off the hot area of the pre-form which represents a thermal reconditioning of the pinch-off flash. Furthermore, at the end of the pre-form cycle, the pressurized air is able to escape through port 28, also aiding the internal thermal conditioning of the blown pairson.

With respect to FIGS. 6-10, as the blown pre-form or injection molded parison is stretch oriented from the dotted position in FIG. 6 to the solid position in FIG. 6, the metal cap 39 further serves to thermally condition the bottom of the pre-form. Should this bottom be at a greater temperature initially than the remainder of the parison, as in the case of injection molding, this thermal conditioning has the effect of cooling the bottom of the parison to the same orientation temperature as the remainder of the pre-form. Should the temperature prove to be still too high, the flat plate 43 or first mold bottom member may include thermal conditioning means as set forth in my prior application Ser. No. 225,448 now abandoned.

Figure 9:
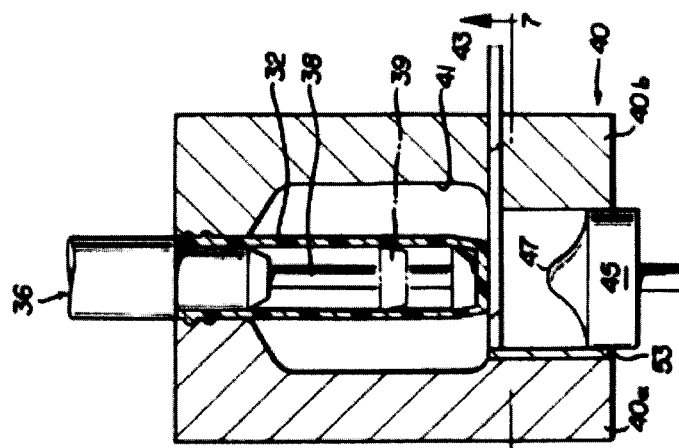

Additional orientation can also be obtained at the central region of the concave bottom 13 by rotating the mandrel cap 64 while contacting the concave undersurface 66 thereof with the blown bottom 69. The same effect can be obtained in the embodiment of FIGS. 1–10 by making the bottom of the mandrel cap 39 concave and rotating the cap 39 while contacting the reformed bottom 13 supported on the convex surface 47. In this manner, when the material is at its orientation temperature, an additional frictional orientation stress can be superimposed on the orientation obtained by reforming as shown in FIGS. 9 and 15. Further, such additional orientation is obtained at the crown of the concave, reformed bottom, where it is most desired and needed.

What is claimed is:

1. In a method of making a blown thermoplastic article having a multi-axially stretch oriented concave bottom of improved strength, from an axially elongated blowable thermoplastic preform; the steps of enclosing said preform in a blow mold defining an interior cavity conforming to the article but having one open side at a location corresponding to the bottom of the article, closing the open side of the mold cavity with a first movable element having a substantially flat surface exposed to the cavity, blowing said preform to the shape of said cavity with one portion of said preform being blown and formed against said flat surface of said first movable element, removing said first element from said open side of said mold cavity, replacing said first element with a second different movable element of different configuration closing the open side of the cavity and having a convex surface exposed to the cavity, and reforming and stretching said one portion of said blown preform to the configuration of the concave bottom of said final article by joint displacement of said second element and the one blown preform portion into said cavity, said step of reforming and stretching being carried out while said preform portion is at a temperature conducive to stretch orientation.

2. In a method as defined in claim 1, the further step of axially stretching said preform into contact with said flat surface of said first movable element prior to the step of blowing said preform.

3. In a method as defined in claim 1, said step of reforming including the step of blowing said one portion of said blown preform.

4. In a method as in claim 1, the improvement wherein the step of reforming and stretching the expanded bottom includes the step of blowing said expanded bottom axially inwardly.

5. In a method of making a blown container of thermoplastic material from an axially elongated blowable preform, the container having a concave bottom, the steps of: enclosing the preform within the interior cavity of a blow mold, said mold cavity conforming to the shape of said container except for one open side closed by a removable first bottom wall having a substantially flat upper surface; blowing the preform interiorly of the mold cavity to the shape of the blown container with the exception of the concave bottom, that portion of the blown preform corresponding to the container bottom being blown against the substantially flat upper surface of said bottom mold wall, so that said portion is substantially planar; removing the first bottom mold wall to expose said substantially planar preform portion in alignment with the mold open side; closing the mold open side with a second and different reforming element having a convex upper surface exposed to said cavity; contacting the upper surface of said reforming element with said substantially planar portion of said preform, displacing said reforming element into the cavity with said convex surface thereof reforming said substantially planar preform portion into a concave bottom for said container, and chilling the concave bottom to its concave configuration.

6. In a method as defined in claim 5, the additional steps of supporting the preform interiorly of the mold cavity on a cantilevered core pin from which the preform is blown during the blowing step; the reforming element, during its reforming operation, displacing the reformed bottom into contact with the free end of the core pin, and blowing the reformed bottom against the core pin to a final concave configuration prior prior to the step of chilling.

* * * * *

UNITED STATES PATENT OFFICE
CERTIFICATE OF CORRECTION

Patent No. 3,949,033　　　　　　　Dated April 6, 1976

Inventor(s) Albert R. Uhlig

It is certified that error appears in the above-identified patent and that said Letters Patent are hereby corrected as shown below:

Column 10, line 47 - delete second "prior"

*Signed and Sealed this*

*twenty-second* Day of *June 1976*

[SEAL]

Attest:

RUTH C. MASON
*Attesting Officer*

C. MARSHALL DANN
*Commissioner of Patents and Trademarks*